April 28, 1959     J. H. WILSON     2,883,737
CLAMP-ON TOOL BIT
Filed April 21, 1953
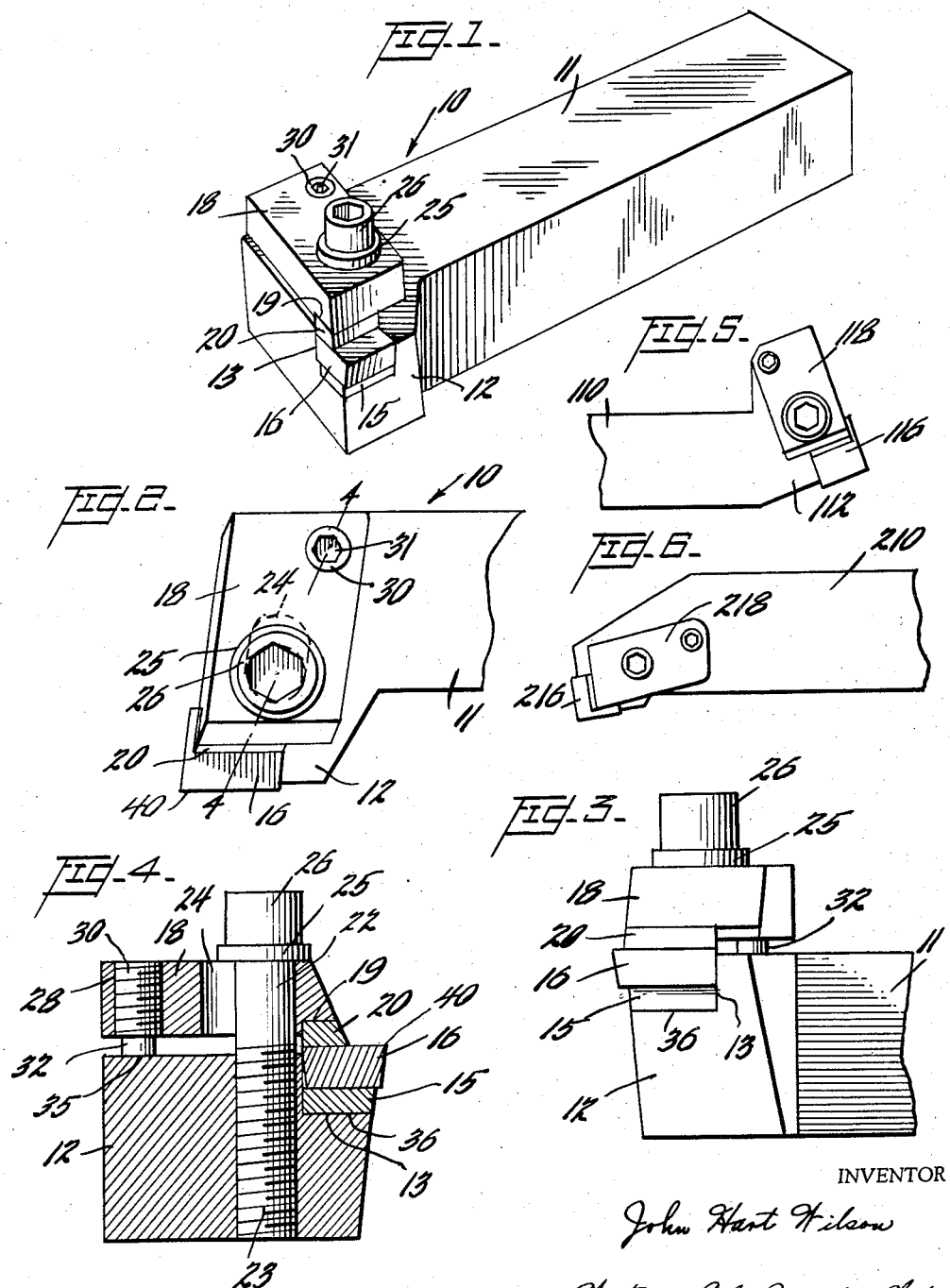

United States Patent Office 2,883,737
Patented Apr. 28, 1959

2,883,737

CLAMP-ON TOOL BIT

John Hart Wilson, Wichita Falls, Tex.

Application April 21, 1953, Serial No. 350,026

1 Claim. (Cl. 29—96)

This invention relates to cutting tools adapted for use in lathes, boring mills and other machine tools, and more particularly to tool bits and means for adjustably but rigidly securing them to their shanks.

The general object of the invention is to provide novel improvements in cutting tools for use in the machines mentioned, which will increase the efficiency and life of the tools and render them readily adjustable for application to various uses and functions.

The invention in its preferred embodiments contemplates the provision of a tool shank which in itself may be of more or less conventional construction, and a readily removable and replaceable bit which is preferably made of carbide or other high-speed heat-resistant alloy. Most carbide tools of the class described are provided by cementing a block or strip of carbide alloy to the tool holder or shank, and thus when the bit wears, the whole tool has to be discarded. By the provisions of the present invention, a detachable bit is secured to the shank or holder by novel clamping means by which great pressure is applied to the bit which is preferably seated upon a support block or pad, the latter preferably being made of high speed steel, the pad also being readily removable from the shank in case of breakage.

The specific clamping device employed in the preferred form of the invention comprises a sturdy block of hard metal utilized as a lever, one end adapted to bear on the bit, the central portion fulcrumed, and screw means adapted to force the opposite end in a direction to bring the first named end heavily to bear upon the bit.

Another novel feature of the invention is the provision of a removable and adjustable chip breaker, which is preferably also made of carbide or an alloy of equivalent properties, and this chip breaker is readily adjustably held in place by means of the same clamping device which serves to secure the bit itself.

Alternatively, within the scope of the invention, the chip breaker element may be either a separate block or may be cemented firmly to the clamp block which secures the tool bit.

Other objects and features of novelty will be apparent from the following specification when read in connection with the accompanying drawings in which certain embodiments of the invention are illustrated by way of example.

In the drawings:

Figure 1 is a view in perspective of a tool embodying the principles of the invention;

Figure 2 is a top plan view of the tool with part of the shank broken away;

Figure 3 is a similar view of the tool in side elevation;

Figure 4 is a vertical sectional view taken on the line 4—4 of Figure 2;

Figure 5 is a diagrammatic view of a left-hand tool embodying the principles of the invention; and Figure 6 is a similar diagrammatic view of a facing tool made according to the invention.

Referring now more particularly to Figures 1–4 of the drawings, the novel tool is designated by the general reference numeral 10 and is provided with a holder or shank 11 which is provided with a slightly enlarged head portion 12 formed at its corner with a polygonal recess 13, of approximately the cross-section of a parallelogram, adapted to receive a tool bit and certain other parts. In the embodiment being described, the recess 13 is formed in the right-hand corner of the head 12 as seen facing the working end of the tool.

Seated in the bottom of the recess in the preferred form of the invention is a hard metal support block 15 preferably made of high speed steel. This block is a desirable, but not indispensable part of the tool, and in some cases the carbide or other hard alloy tool bit 16 may be seated directly in the recess without the interposition of the support block or pad.

Disposed above the head portion 12 of the holder 11 is the clamping block 18 and it will be seen that the underside of the end of the clamping block 18 which is disposed above the bit 16 is recessed as at 19 to receive a chip breaker 20 which comprises a block of carbide or other extremely hard alloy which bears directly upon the upper surface of the bit 16.

As probably most clearly seen in Figures 2 and 4 of the drawings, the clamping block 18 takes the form of a lever, the right-hand end of which, as viewed in Figure 4, bears heavily upon the chip breaker 20 and the bit 16.

A socket-head cap-screw 22 is threaded as at 23 into a vertical opening in the shank head 12 and the upper unthreaded portion of the shank of the screw passes through an elongated vertical opening 24 in the clamping block or lever 18, the collar 25 forming part of the head of the screw bearing upon the margins of the opening 24 as the screw is threaded downwardly into the shank by means of an appropriate tool applied to the hexagonal socket head 26.

The left-hand portion of the block or lever 18, as viewed in Figure 4, is provided with a vertical opening 28 into which the heel screw 30 is threaded. This heel screw is provided with a manipulative socket 31 and a bearing projection or stud portion 32 which contacts the upper surface of the head 12 of the shank of the tool, and as the screw 30 is threaded downwardly through the block 18, the end 32 bears heavily upon the surface of the shank, thus exerting tremendous leverage upon the chip breaker 20 and the bit 16.

Preferably—for example, in order to prevent cratering—the areas or zones 35 and 36 upon which the stem 32 of the heel screw and the bit 16 respectively bear, are flame hardened.

By virtue of the elongation of the vertical opening or slot 24 in the clamping block 18, the block may be adjusted laterally, as viewed in Figure 4, in order to dispose the chip breaker 20 at selected variable distances from the cutting edge 40 of the tool bit 16. This is of course to determine the size of chips into which the metal cut off from the work is broken. It is obvious of course that the shifting of the block 18 with reference to the screw 22, which acts as a fulcrum therefor, will vary the leverage of the clamping block, but the pressure available will always be sufficient to apply an exceedingly great clamping force to the cutting and chip breaking elements, when the heel screw 30 is screwed down firmly upon the head of the shank. Needless to state, the adjustment position shown in Figure 4 is the one which affords the greatest length of chip and incidentally the highest clamping pressure.

In the preferred form of the invention, the chip breaker 20 is cemented within the recess 19 of the block 18, but within the scope of the invention the chip breaker 20 may be a separately removable element of the combination.

An inspection of Figure 2 of the drawings will show that the block 18 bears generally centrally upon the bit 16 and the section line 4—4 shows the leverage alignment between the approximate center of the bit 16, the axis of the clamp or fulcrum screw 22, and the axis of the adjustable heel screw 31.

In Figure 5 of the drawings there is shown diagrammatically a left-hand tool 110 having an enlarged head 112, a tool bit 116, and a clamping block or lever 118. The general construction and the operation of this left-hand tool is the same as the right-hand tool previously described and no detailed description of this embodiment is believed to be necessary.

Similarly, an embodiment showing a facing tool is illustrated in Figure 6 of the drawings, this embodiment being designated generally by the numeral 210, the bit being indicated at 216 and the clamping block or lever at 218.

Various changes and modifications may be made in the embodiments illustrated and described herein without departing from the scope of the invention as defined by the following claim.

Having thus described the invention, what is claimed as new and desired to be secured by Letters Patent is:

A cutting tool of the class described comprising a shank formed with a tool bit recess having a flat bottom face, a tool bit removably seated in said recess, said tool bit being of square shape in plan, with each of its perimetrical edges comprising a cutting edge, and having relatively parallel upper and lower faces, whereby said tool bit may be selectively angularly adjusted about its center parallel to its said faces to selectively present any of said cutting edges in operative position directed away from said shank, a fulcrum element on said shank spaced from said bit, a clamping lever medially fulcrumed on said element and having a clamping end projecting over said bit, a chip breaker carried at said end of the lever in operative clamping and chip breaking relation with said bit adjacent to said operative cutting edge, means defining a movable connection between said lever and its fulcrum for permitting lengthwise bodily adjustment of the lever and said chip breaker relative to the fulcrum and to said cutting edge, and a screw threaded through said end of the lever remote from the chip breaker for adjustment with said lever, said screw being in endwise abutment with the shank and normally thrusting against said shank to transmit a clamping force to the clamping end of said lever, said shank and said tool bit being provided with plane surfaces parallel to each other and to the flat bottom face of said recess, the abutment of the screw with said shank being against said plane surface of the shank, said plane surface of the bit constituting the aforesaaid upper face thereof, said fulcrum element comprising a bolt threaded into said plane surface of the shank normally thereto, said lever having an elongated slot therethrough in the direction of its length, said slot receiving said bolt and said bolt having an enlarged head extending across said slot to define the fulcrum of the lever, said slot extending lengthwise of the lever for a distance appreciably greater than the diameter of the bolt to permit both lengthwise bodily adjustment and tilting of the lever, said chip breaker having a flat clamping face disposed for relatively parallel clamping engagement with said plane surface of the bit, and said screw bearing against said plane surface of the shank, whereby said lengthwise adjustment of the lever may be effected without destroying the parallel relationship between the flat face of said chip breaker and the said plane surface of the bit when the lever is secured in its new position, and said bit may be partially rotated in a plane parallel to its said upper and lower faces to bring a fresh cutting edge into operative position.

References Cited in the file of this patent

UNITED STATES PATENTS

| | | |
|---|---|---|
| 1,056,653 | Fish | Mar. 18, 1913 |
| 1,776,335 | Rauzieres | Sept. 23, 1930 |
| 1,854,672 | Robinson | Apr. 19, 1932 |
| 2,392,285 | Gauthier | Jan. 1, 1946 |
| 2,675,604 | Plummer | Apr. 20, 1954 |

FOREIGN PATENTS

| | | |
|---|---|---|
| 138,040 | Great Britain | Jan. 20, 1920 |
| 169,435 | Great Britain | Aug. 31, 1922 |
| 257,171 | Switzerland | Mar. 16, 1941 |
| 453,173 | Great Britain | Sept. 7, 1936 |
| 968,404 | France | Apr. 19, 1950 |
| 989,307 | France | May 23, 1951 |
| 1,031,998 | France | Mar. 25, 1953 |
| 1,041,370 | France | May 27, 1953 |